United States Patent [19]

Gammel et al.

[11] Patent Number: 5,832,429
[45] Date of Patent: Nov. 3, 1998

[54] METHOD AND SYSTEM FOR ENROLLING ADDRESSES IN A SPEECH RECOGNITION DATABASE

[75] Inventors: Michele B. Gammel, Farmers Branch; Thomas Drew Fisher, Dallas, both of Tex.

[73] Assignee: Texas Instruments Incorporated, Dallas, Tex.

[21] Appl. No.: 712,043

[22] Filed: Sep. 11, 1996

[51] Int. Cl.⁶ ................................................ G10L 7/08
[52] U.S. Cl. ....................... 704/255; 704/250; 704/243
[58] Field of Search ................................. 704/236, 258, 704/255, 256, 246, 250, 251, 243, 252, 254; 379/63, 88, 67

[56] References Cited

U.S. PATENT DOCUMENTS

| | | | |
|---|---|---|---|
| 5,054,053 | 10/1991 | Sakanishi et al. | 379/63 |
| 5,165,095 | 11/1992 | Borcheding | 379/88 |
| 5,179,921 | 1/1993 | Vysotsky et al. | 704/246 |
| 5,212,730 | 5/1993 | Wheatley et al. | 395/2.65 |
| 5,452,340 | 9/1995 | Engelbeck et al. | 379/67 |
| 5,524,169 | 6/1996 | Cohen et al. | 395/2.4 |
| 5,598,507 | 1/1997 | Kimber et al. | 395/2.55 |

*Primary Examiner*—Richemond Dorvil
*Attorney, Agent, or Firm*—Robert L. Troike; Wade James Brady, III; Richard L. Donaldson

[57] ABSTRACT

A method and system for enrolling speed dial names includes providing speaker dependent templates and associated telephone numbers and providing a penalized garbage model for unrecognized speech. When a request for a new template is received it is determined if the list of speed dial names is full (Step 201) and is not it is determined if that name is too similar (Step 205) to a name already on the speed dial list. If so, that name is rejected but if not it is determined if the speed dial name is too short (Step 302), and if not; too short or if the user wants to enter the short name the system asks the user to repeat the speed dial name and if a match it is entered. If not a match the system will swap the first and second utterance and compare to see if a match.

32 Claims, 7 Drawing Sheets

METHOD AND SYSTEM FOR ENROLLING ADDRESSES IN A SPEECH RECOGNITION DATABASE

TECHNICAL FIELD OF THE INVENTION

This invention relates to speech recognition and more particularly to enrollment of speech recognition addresses in a speech recognition database.

BACKGROUND OF THE INVENTION

The enrollment of name addresses in a speech recognition database is used in speed dialing. Speed dialing is where, for example, a certain number or bank of telephone numbers are pre-stored and the user only has to address that bank of numbers by saying a name to have the telephone number called. It is highly desirable that the user speed dial by speaking the addresses by name into the telephone and the telephone number associated with that name in the bank of telephone numbers is dialed up. It is desirable therefore to provide some improved method and system for enrolling the speed dial name addresses into the telephone system so that the correct numbers will be dialed when spoken into the telephone system.

SUMMARY OF THE INVENTION

In accordance with one preferred embodiment of the present invention a method and system for enrolling addresses as names in a speech recognition database is provided by providing a penalized garbage model for unrecognized speech, receiving a new utterance for enrollment from a user and generating a template of the new utterance. A repeat of the utterance is then compared to the template to determine if the new utterance template should be entered into the database.

In accordance with another preferred embodiment of the present invention a method and system for enrolling names in a speech recognition database includes a database with speaker dependent templates and penalized garbage model and comparing the name to be enrolled to the names in the database to reject any name that is too similar.

In accordance with another preferred embodiment of the present invention determining if the name to be enrolled into the database is too short before entering into the database.

DETAILED DESCRIPTION OF THE INVENTION

Figure 1:
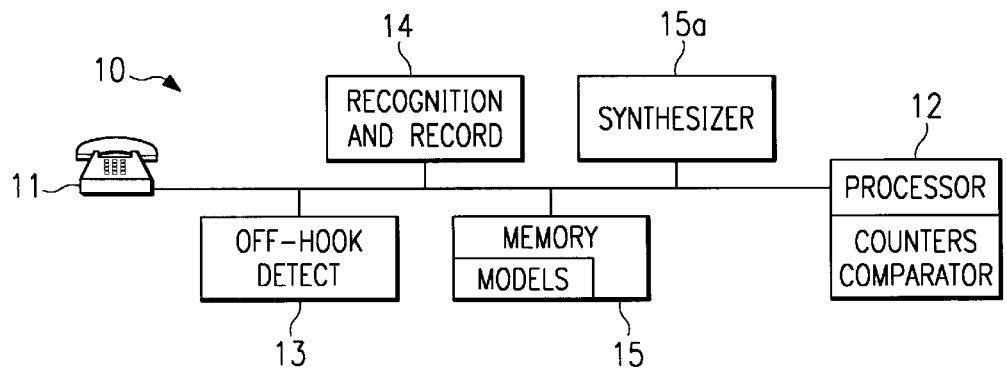
FIG. 1 illustrates a simplified block diagram of a telephone system that implements a method of the present invention.

FIG. 1 is a simplified block diagram of a telephone system 10. Telephone system 10 includes a telephone 11 that connects to a processor 12. An off-hook detect circuit 13 and a recognition and record circuit 14 connect to telephone 11 and processor 12. Processor 12 also connects to a memory 15. In operation, off-hook detect circuit 13 informs processor 12 that telephone 11 indicates an off-hook condition and allows processor 12 to monitor commands according to a program stored within and executed by processor 12. The program within processor 12 allows a user to generate a directory name address and a speed dial list of entry names and corresponding phone numbers associated with the directory name address. Telephone system 10 stores speaker dependent templates of the directory name address and associated entry names and phone numbers such that each user can access only this specific directory name and speed dial list.

Figure 2:
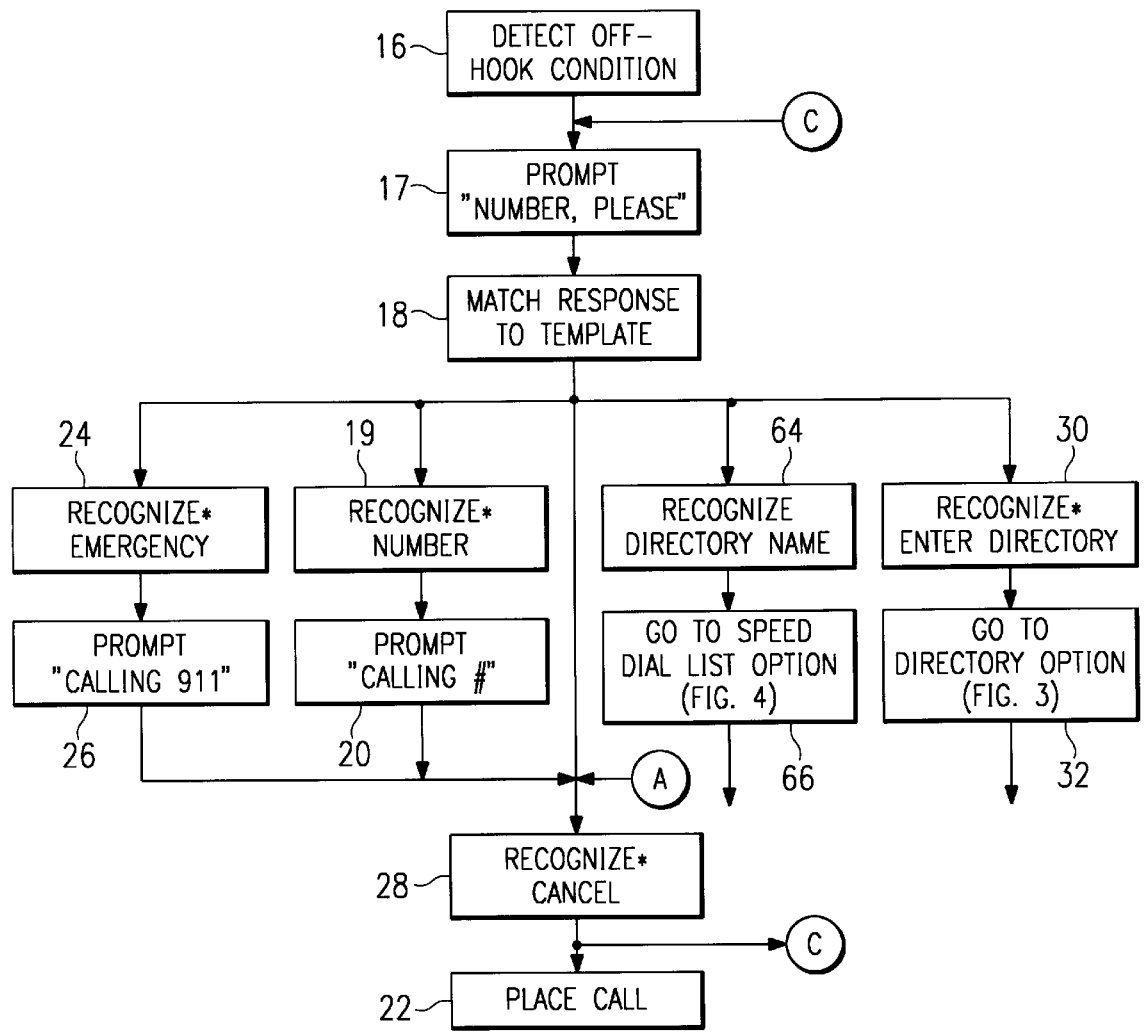
FIG. 2 illustrates a flow diagram of a method for generating multi-user spoken speed dial directions in the voice recognition telephone system.

FIG. 2 is an initial flow diagram of a method for generating multi-user spoken speed dial directories in voice recognition telephone system 10. The processor 12 in one embodiment is programmed according to this flow diagram. Off-hook detect circuit 13 of telephone system 10 monitors telephone 11 at step 16 to detect an off-hook condition on the specific telephone. Once detection of an off-hook condition occurs, processor 12 prompts a user to input a command at step 17. At step 18, processor 12 in conjunction with recognition and record circuit 14 which may include processor including a comparator and memory 15 compares the user's response to one of a plurality of templates encoded into memory 15 of telephone system 10. The flexibility of telephone system 10 allows for receiving at step 18 either spoken words from a user or, in some instances, corresponding DTMF push button codes from telephone 11 representing spoken command words. Throughout the drawings, an asterisk indicates that telephone system 10 can recognize either spoken command words or corresponding DTMF push button codes representing the command words. Asterisks also indicate that telephone system 10 performs speaker independent speech recognition in matching a model to a user's response. For illustrative purposes only, the description of the preferred embodiment shall proceed as though the telephone system receives spoken responses instead of representative commands through corresponding DTMF push button codes.

At step 18, telephone system 10 may recognize one of various command phrases and proceed according to the requested command. Telephone system 10 may recognize a telephone number at step 19 received from a user as a first command. Telephone system 10 informs the user at step 20 of the number received and the sequence will continue to step 22 where the telephone number will be automatically dialed in order to place the requested call. Telephone system 10 may also recognize an emergency command at step 24, such as "help", as a second command phrase received from the user. Telephone system 10 notifies the user at step 26 that the emergency telephone number, such as 911, is being dialed and the sequence proceeds to step 22 where once again the call will be placed. The telephone system may also recognize a third command phrase, CANCEL, from the user which automatically returns the telephone system to step 17, ceasing any command sequence currently in progress. For example, as shown in FIG. 1, the user may halt the placement of a telephone call prior to a connection being made at the other end of the telephone line. Though shown at only one point in FIG. 1, the recognition of a CANCEL command at step 28 may occur anywhere within the telephone system method described in reference to subsequent figures.

Figure 3:
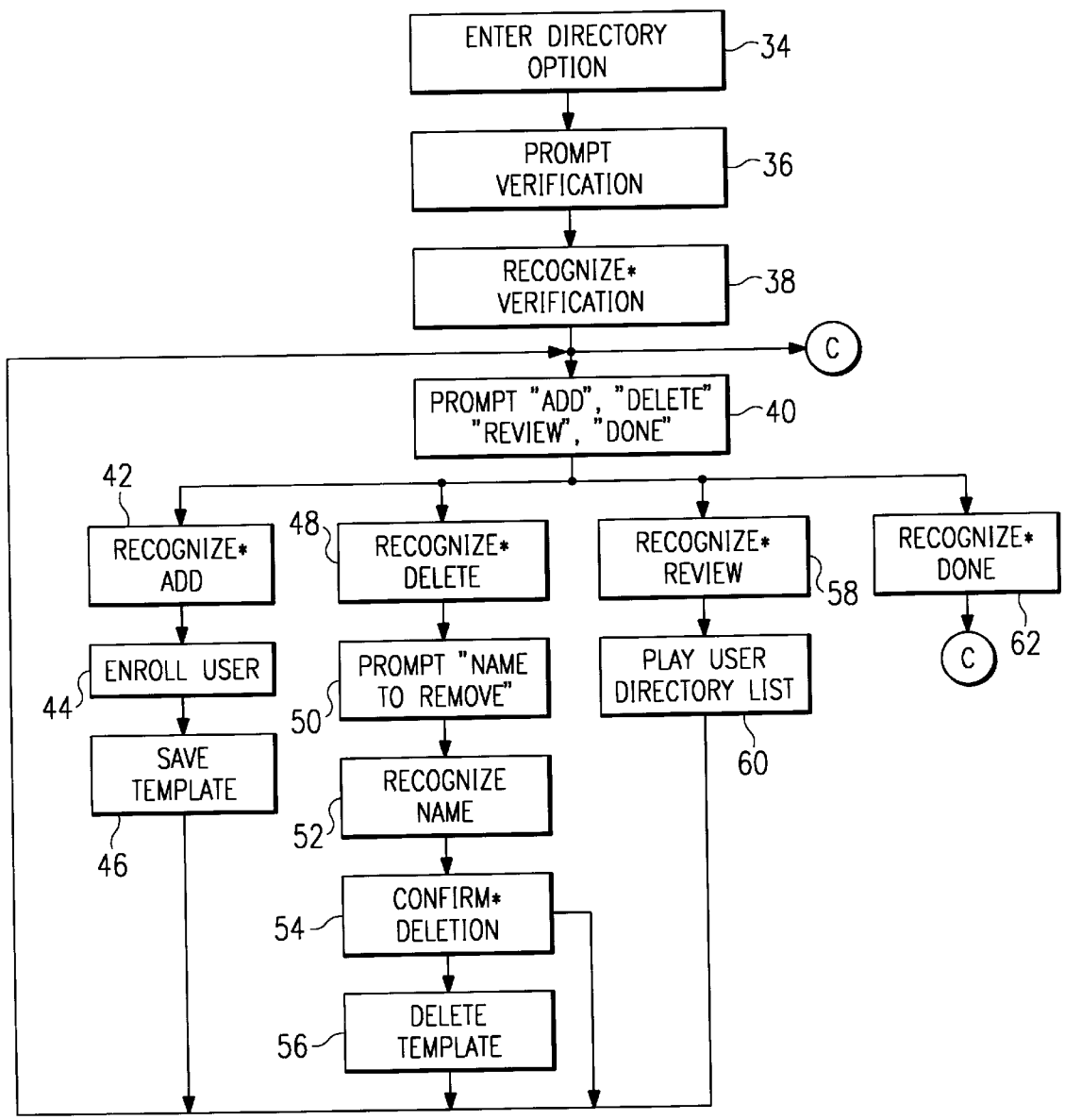
FIG. 3 illustrates a general flow diagram of enrolling and deleting a directory name within the telephone system.

Telephone system 10 may recognize a fourth command word at step 30 when the user requests to enter the user directory list. When telephone system 10 recognizes this command, the process flows to step 32 to allow the user to enter the directory option. FIG. 3 illustrates a flow diagram of the process steps in the directory option portion of the telephone system program. Upon command recognition, the user enters the directory option at step 34. To ensure that only authorized users may enter the directory option, telephone system 10 implements security measures at steps 36 and 38, requiring the user to provide a verification of the authority to enter the directory option. The verification may be an authorization code that the user inputs into the system or there may be speaker dependent speech recognition templates to match the user's speech patterns to verification templates stored within telephone system 10.

At step 36, telephone system 10 prompts the user for the proper verification and recognizes the user's verification response at step 38. Telephone system 10 may perform steps 36 and 38 more than one time as part of the verification process. If the telephone system does not recognize the verification code given by the user, process flow returns to step 17 of FIG. 2 in a similar manner as a CANCEL command. If telephone system 10 recognizes a valid verification code, process flow continues to step 40 where telephone system 10 prompts the user to input one of four commands for the directory option. Also see Kero, U.S. Pat. No. 5,369,685 for user verification.

Once the user has provided the appropriate verification and enters the directory option, telephone system 10 may recognize a first subcommand word at step 42 to add a user directory name to the system. Telephone system 10 enrolls the user at step 44 by requesting a directory name and saving the user's response in a template at step 46 to be stored within the telephone system. In enrolling a user directory name, telephone system 10 may repeat steps 44 and 46 in order to create the template and save it with the existing list of user identification templates already registered for that account or telephone. Once a template is saved, process flow returns to step 40 where telephone system 10 prompts the user for another command word.

Telephone system 10 may recognize a second subcommand word at step 48 to delete a user directory name. When recognized, telephone system 10 prompts the user at step 50 for the name of the user directory to delete. Telephone system 10 recognizes the directory name given by the user at step 52 and requests the user to confirm the deletion of the directory name at step 54. If the user does not confirm deletion of the directory name, process flow returns to step 40 where telephone system 10 prompts the user for a command phrase. If the user does confirm deletion of the directory name at step 54, telephone system 10 deletes the template at step 56 created for that directory name and any telephone list entries corresponding to that directory name. Once deleted, process flow returns to step 40 where telephone system 10 prompts the user for a new command phrase.

Telephone system 10 may recognize a third subcommand phrase at step 58 to review the list of directory names. When recognized; telephone system 10 plays the user directory list at step 60 before returning to step 40 to request a new command phrase. Telephone system 10 may also recognize a fourth command phrase at step 62, determining that the user has completed the directory option request. When recognized, process flow returns to step 17 of FIG. 2 where telephone system 10 prompts the user for a telephone number.

Figure 4:
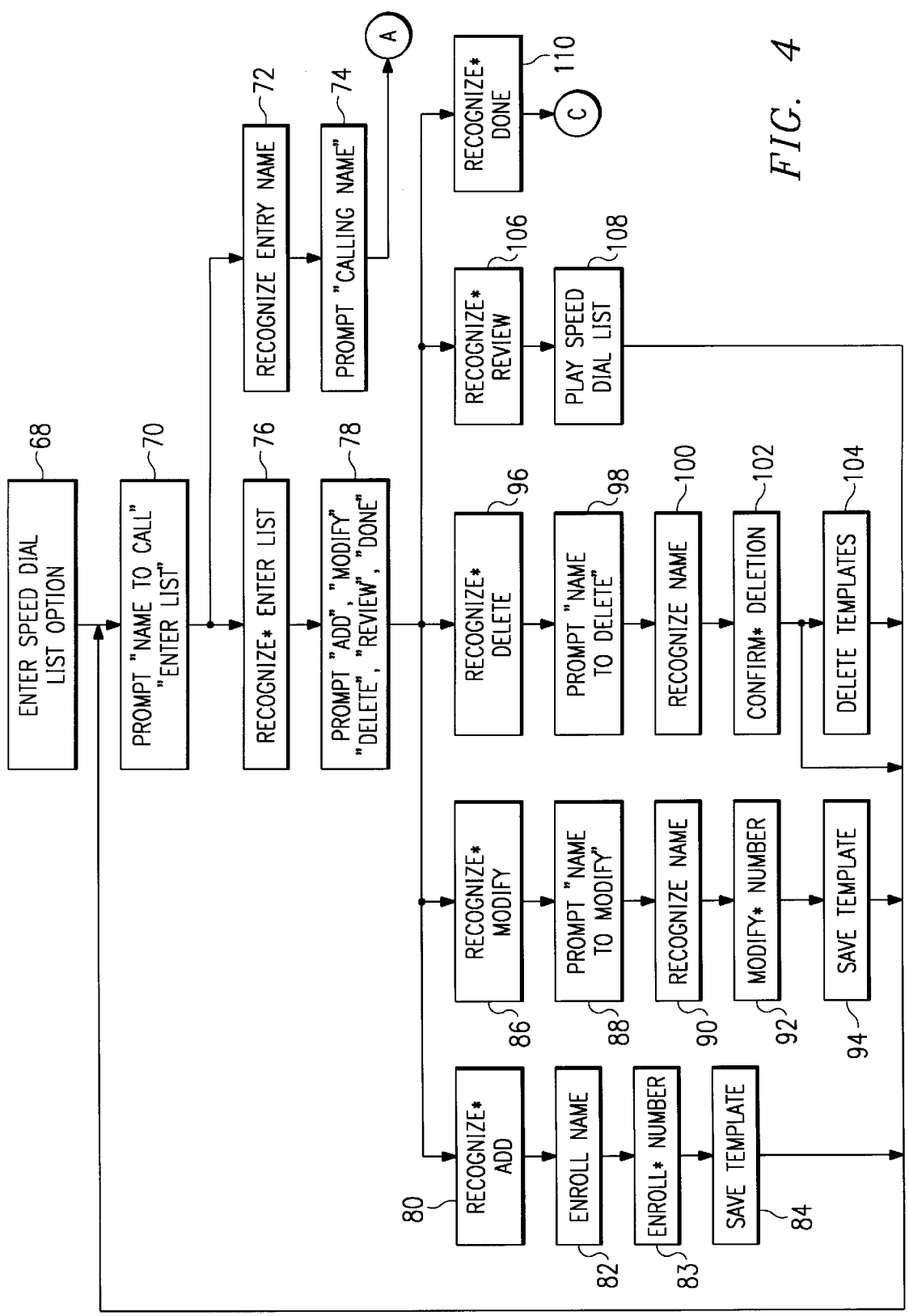
FIG. 4 illustrates a flow diagram of a method for enrolling and modifying a speed dial list corresponding to a directory name in the telephone system.

Returning to FIG. 2, telephone system 10 may recognize a directory name at step 64 as a fifth command phrase. When telephone system 10 recognizes a user directory name, process flow proceeds to step 66 where the telephone system enters a speed dial list option. FIG. 4 is a flow diagram of the speed dial list option process of the present invention. Telephone system 10 enters the speed dial list option at step 68 and subsequently prompts the user at step 70 to either request a name to call or enter the list. When telephone system 10 recognizes an entry name at step 72, a prompt is given to the user at step 74, indicating the requested name to be called by telephone system 10. Telephone system 10 then places the call at step 22 in FIG. 2 as previously described. Telephone system 10 may also recognize and enter a list command at step 76 and prompt the user for one of five list command phrases at step 78.

Telephone system 10 may recognize a first list command phrase at step 80 to add an entry name and phone number to the speed dial list under the user's directory name. When recognized, telephone system 10 prompts the user at step 82 to enroll the entry name into the speed dial list. Telephone system 10 prompts the user at step 83 to enroll a phone number corresponding to the entry name just enrolled at step 82. Telephone system 10 creates and saves a template corresponding to the name and phone number enrolled by the user at step 84. Telephone system 10 may repeat steps 82, 83, and 84 in order to verify and create a valid template of the entry name and phone number for the speed dial list. Once saved, process flow returns to the beginning of the speed dial list option routine at step 70.

Telephone system 10 may recognize a second list command at step 86 to modify a phone number corresponding to an entry name. When recognized, telephone system 10 prompts the user at step 88 to provide the name whose phone number is to be modified. Telephone system 10 recognizes the name given by the user at step 90 and allows the user to modify the telephone number corresponding to that name at step 92. Telephone system 10 saves a template of the modified number corresponding to the entry name with which modification was requested at step 94. Telephone system 10 may repeat steps 92 and 94 to ensure valid creation of the telephone number template. Once the template is saved, process flow returns to step 70 as previously described.

Telephone system 10 may recognize a third list command at step 96 to delete a name from the speed dial list. When recognized, telephone system 10 prompts the user at step 98 for the name to be deleted from the speed dial list. Telephone system 10 recognizes the name at step 100 and requests the user to confirm deletion of the name at step 102. If the user does not wish to delete the entry name, process flow returns to step 70. If the user does confirm deletion of the entry name, the telephone system deletes the entry name template and corresponding phone number template at step 104 before routing the process flow back to step 70.

Telephone system 10 may recognize a fourth list command phrase at step 106 to allow a user to review his speed dial list. When recognized, telephone system 10 plays the user's speed dial list at step 108 and returns process flow back to step 70.

Telephone system 10 may also recognize a fifth list command phrase at step 110, indicating that the user has completed the speed dial list option. When recognized, process flow returns to step 17 of FIG. 2 and the method repeats as previously described.

In summary, a telephone system may generate a separate directory for each authorized user of the telephone system. Each user may create a speed dial list containing names and phone numbers under the user's own directory. By using speaker dependent features, no one can gain access to an authorized user's directory or speed dial list. The above is by way of background to enrollment of speed dial names using voice recognition.

Figure 5:
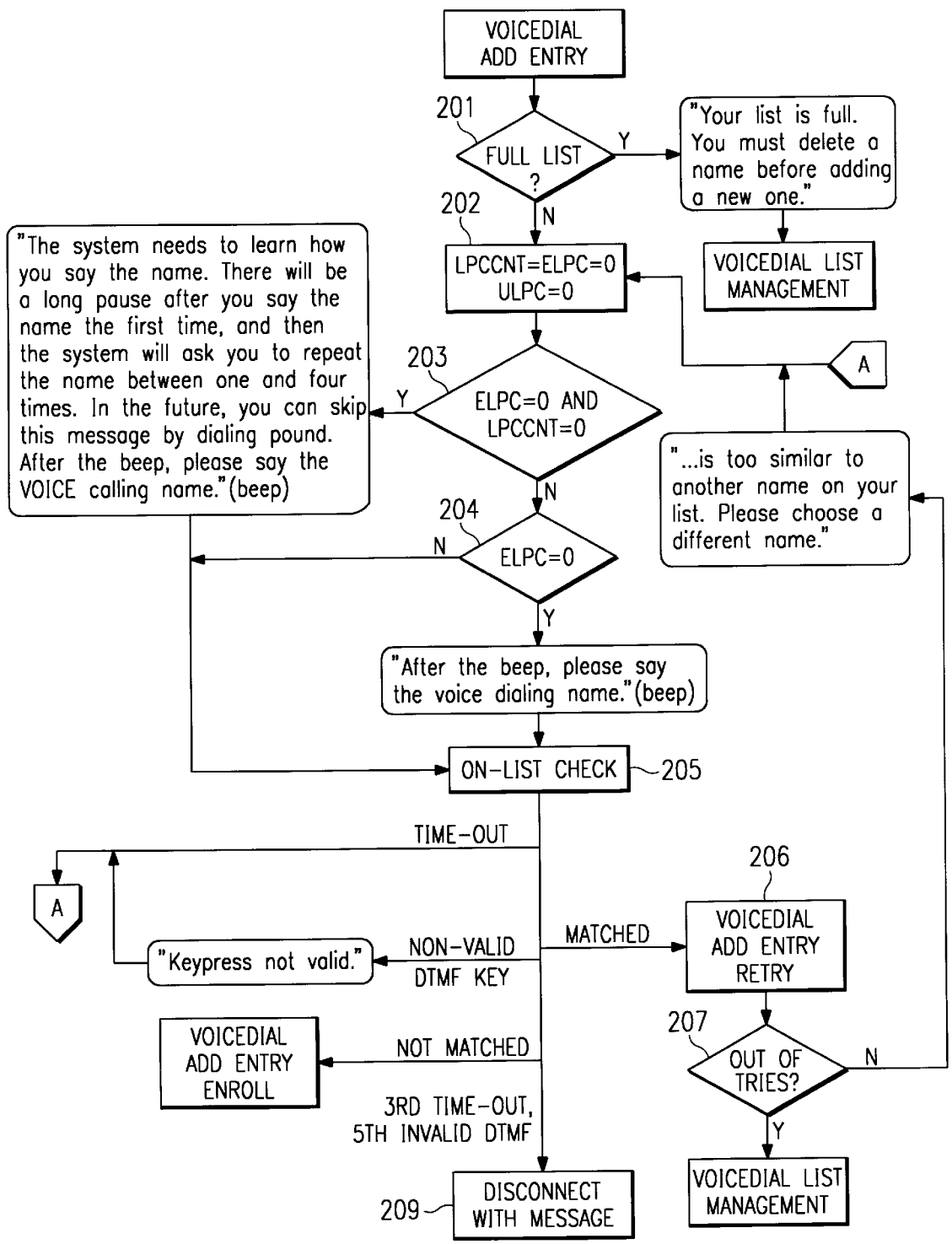
FIG. 5 is a flow chart of voice dial add entry according to one embodiment of the present invention.

The processor 12 in FIG. 1, according to one embodiment of the present invention, is programmed operate according to the flow chart of FIG. 5 to enroll speed dial names into a speed dial list. The processor 12 includes ELPC and ULPC counter and it allows a subscriber to create a base phrase and then update it. The subscriber is allowed three chances to say the spoken name to get it into a list in a manner to best recognize the spoken name. The system also addresses the problem of the subscriber adding a name to the list that is either already on the list or add a very similar name to the list. It also addresses the problem of the subscriber saying the name too differently as it is enrolled and updated.

Figure 6:
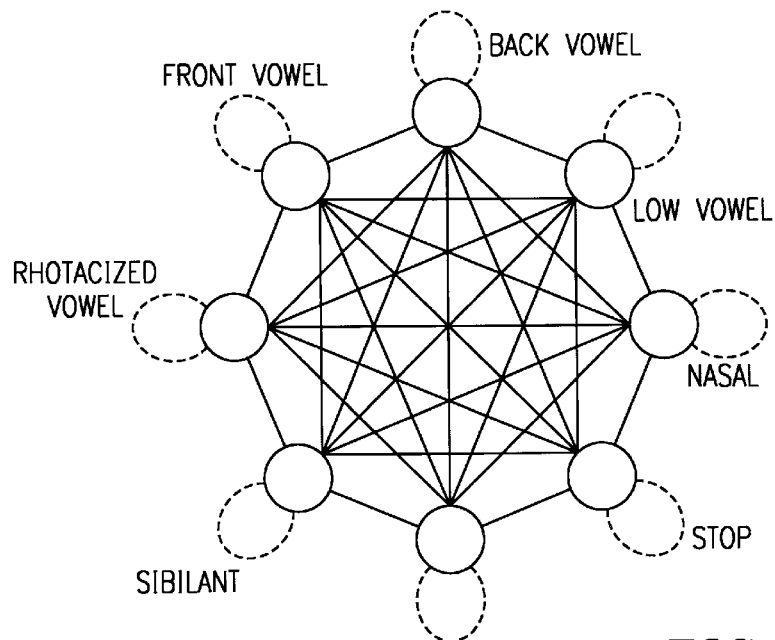
FIG. 6 illustrates a single garbage model.

Recent developments in the use of garbage models to determine out-of vocabulary speech have given rise to new recognition process that provide an out-of-vocabulary recognition capability as well as preserving a high rate of in-vocabulary recognition. This new recognition process utilizes a penalized garbage model in parallel with spoken speed dialing names to discriminate out-of-vocabulary speech. This approach is applied to spoken speed dialing enrollment recognition to address the problem enrollment of names already on a speed dial list and too much variability during enrollment. A "garbage model" is defined as a model for any speech which may be words or sounds for which no other model exists within the recognition system. There are several possibilities for means of constructing garbage models. A single garbage model commonly used in state-of-the art recognition, shown in FIG. 6 models a collection of broad phonetic classes of speech sounds which are linked too form sounds making up a word. As shown in FIG. 6 the circles represent the acoustic broad phonetic classes. The solid lines indicate transitions that may be made in either direction from one broad phonetic class to another. The dotted lines indicate that the model may loop on a particular state. Transitions are weighted by probabilities based on temporal phonotactic constraints. These constraints require that the longer a given phonetic class is used to explain speech, the less likely the class will be used to explain speech, the less likely the class will be used to explain subsequent speech, and the more likely subsequent speech will be explained by other different phonetic classes. The model may begin explaining speech by entering or leaving at any state.

During similar name checking, recognition is performed with the Lew name being added to the list. The new name can either match an existing name on the list, or match the parallel garbage model. If the name matches an existing name, then the user is informed that the name or a similar name is already on the list, and that the name will not be added. If the new name matches the parallel garbage model, then it is assumed that the name is not on the list and the addition of the name continues. The penalty on the garbage model can be adjusted to affect the sensitivity to matching either a name on the list or to the garbage model.

The garbage model my preferably be like the phonotactic garbage model discussed in application Ser. No. 08/710,001, entitled "Enrollment; and Modeling Method and Apparatus for Robust Speaker Dependent Speech Models" of Lorin Netsch, et al. filed concurrently herewith. This model has language constraints.

The subscriber when trying to enroll a new name to the speed dial list enters a menu entitled "Voice Dial List Management" or position 40 in FIG. 3 or 78 in FIG. 4, and enters or says "Add Entry". When this command is recognized the system first checks at step 201 whether or not the list is full. If it is full, the system notifies user it is full. This can be done by a synthesized voice command from memory 15 and synthesizer 15a that states, "Your list is fill. You must delete a name before adding a new one." The user may return to the List Management and delete a name on the list. See steps 96–104 in FIG. 4. If the list is full or after deleting a name on the list and returning to "Add Entry LPCCNT" ELPC and ULPC counters are set to zero (step 202). The system will then keep count of the Enrollment LPC (Linear Predictive Coding) or ELPC and the Update Linear Predictive Coding (ULPC) counts. The LPC is a speech sample represented by linear prediction parameters. LPC is assumed to be linear. For more on LPC, for example, see pages 81–124 on "Linear Predictive Coding of Speech" by Bishnu S. Ital (Chapter 4) in "Computer Speech Processing", edited by Frank Fallside and William Woods, Prentice Hall (ISBN 0-13-163841-6). This is incorporated herein by reference. If the count of ELPC and ULPC are both zero (step 203) indicating that nothing has been entered before, a tutorial, synthesized prompt statement is played (decision "yes" at step 203). The synthesized statement may say, "The system needs to learn how you say the name. There will be a long pause after you say the name the first time, and then the system will ask you to repeat the name between one and four times. In the future, you can skip this message by dialing pound. After the beep, please say the voice calling name."

Figure 7:
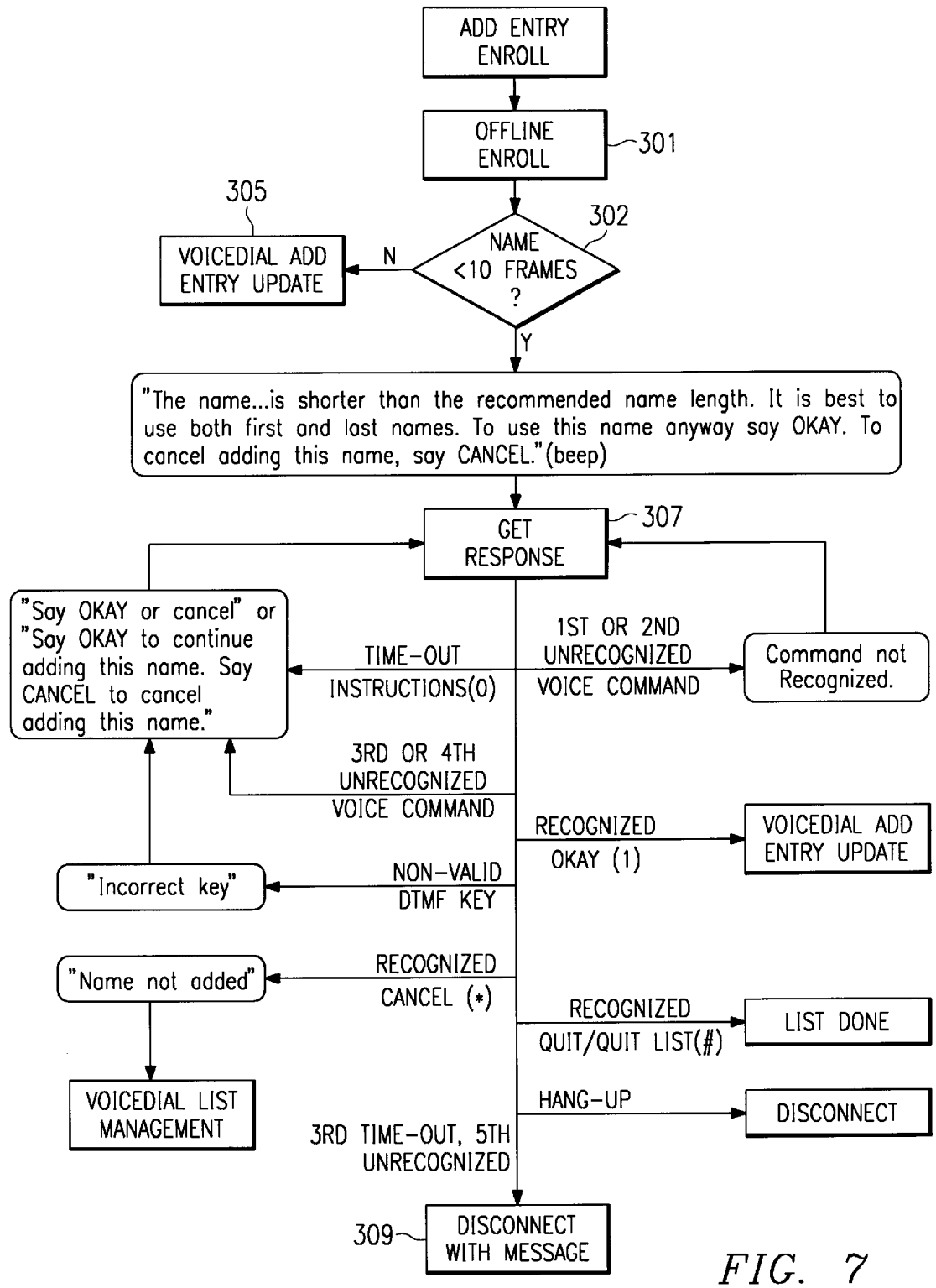
FIG. 7 is a flow chart of voice dial add entry enroll in FIG. 5.

(a beep sounds at the end for the user to say the name.) The user says the name. A check is made at step 205 to determine if the name is already on the list of fifteen (for example) names listed or dose to a name or matches the garbage model. If there is a match to that on the list (indicating a similar name already in the list) the system enters the Add Entry Retry of step 206. If out of retries is "yes" (step 207) then the system goes back to the menu of voice dial list management or position 40 in FIG. 3 or 78 in FIG. 4. If not out of tries ("no" at step 207) the system plays via the synthesizer 15a a "too similar" message (". . . is too similar to another name on your list. Please choose a different name") and increments the ELPC counter 202 shown on FIG. 5 and uses the shorter prompt ("After the beep, please say the voice dialing name") to try again. If the user does not give a new name in time, the system times out, increments the counter and requests a new name. If a key on the keyboard is pressed that is not valid and/or after a time out, the system increments the counter at step 202 and asks for a spoken name. If the system fails to enroll after three tries or fifth invalid DTMF key, the system disconnects (step 209). If the spoken name is not matched the system goes to the "Add Entry Enroll" of FIG. 7.

After a successful saying of a name that isn't matched at Add Entry Enroll in FIG. 5 the system follows the flow chart of FIG. 6. The utterance is stored when we start the on-line enrollment. The saved utterance is used to create a template (step 301) by performing an off-line enrollment. If the length of the utterance is not too short such as greater than or equal to a minimum threshold such as, for example, ten frames of data ("no" at step 302) the system proceeds to step 305 to add entry update and follows the flow chart of FIG. 8. If the message is too short or less, than the minimum threshold (less than ten (10) frames of data for the example) ("yes" at step 302), the system asks via the synthesizer if the user wants to use the template even if it hasn't been used before. If "yes" meaning less than the minimum threshold, the prompt message may state:

"The name [name given] is shorter than the recommended name length.

It is best to use both first and last names. To use this name anyway say OKAY. To cancel adding this name, say CANCEL."

This is followed by a beep prompt. If "OKAY" is received at response step 307, the system proceeds to Add Entry Update of FIG. 8. If "CANCEL" is received, a synthesized statement is generated and provided such as, "Name not added" and the system proceeds back to the Voice List Management Menu or position 40 in FIG. 3 or 78 in FIG. 4. If nothing is said (time out), an unrecognized command or an incorrect key is pressed the system provides synthesized instructions and goes back to looking for a response. If after five times there is not a recognized response or after three time outs, the system is disconnected with a message (step 309). If a DTMF key is pressed the synthesizer provides the message "incorrect Key". After each time out, each wrong key and after the third and forth unrecognized voice command the synthesizer may state, "Say OK or Cancel" or for more detailed instructions, "Say okay to continue adding this name. Say cancel to cancel adding this name." If "OKAY" is recognized even if a short name, the system proceeds to the Add Entry Update of FIG. 8.

In determining the recognize the system uses the garbage model with penalties listed below.

start_garbage_pssd).
_garbage_pssd, 0.6→ _rhot, s1_rhot.
_garbage_pssd, 0.6→ _backv, s1_backv.
_garbage_pssd, 0.6→ _frontv, s1_frontv.
_garbage_pssd, 0.6→ _fric, s1_fric.
_garbage_pssd, 0.6→ _nasal, s1_nasal.
_garbage_pssd, 0.6→ stop, s1_stop.
_garbage_pssd, 0.6→ sib, s1_sib.
_garbage_pssd, 0.6→ lowv s1_lowv.
s1_rhot, 6e-06→ "".
s2_rhot, 0.06→ "".
s3_ 0.6→"".
s1_backv, 6e-06→"".
s2_backv, 0.06→"".
s3_backv, 0.18→"".
s4_backv, 0.3→"".
s5_backv, 0.6→"".
s1_frontv, 6e-06→"".
s2_frontv, 0.06→"".
s3_frontv, 0.18→"".
s4_frontv, 0.3→"".
s5_frontv, 0.6→"".
$s_1$_fric, 6e-06→"".
s2_fric, 0.06→"".
s3_fric, 0.18→"".
s4_fric, 0.3→"".
s5_fric, 0.6→"".
s1_nasal, 6e-06→"".
s2_nasal, 0.06→"".
s3_nasal, 0.6→"".
s1_stop, 6e-06→"".
s2_stop, 0.06→"".
s3_stop, 0.6→"".
s1_sib, 6e-06→"".
s2_sib, 0.06→"".
s3_sib, 0.18→"".
s4_sib, 0.3→"".
s5_sib, 0.6→"".
s1_lowv, 6e-06→"".
s2_lowv, 0.06→"".
s3_lowv, 0.18→"".
s4_lowv, 0.3→"".
s5_lowv, 0.6→"".

If the received template has a high score for any of the listed garbage models it receives a high score for unrecognizable speech and is rejected as unrecognized speech.

Figure 9:
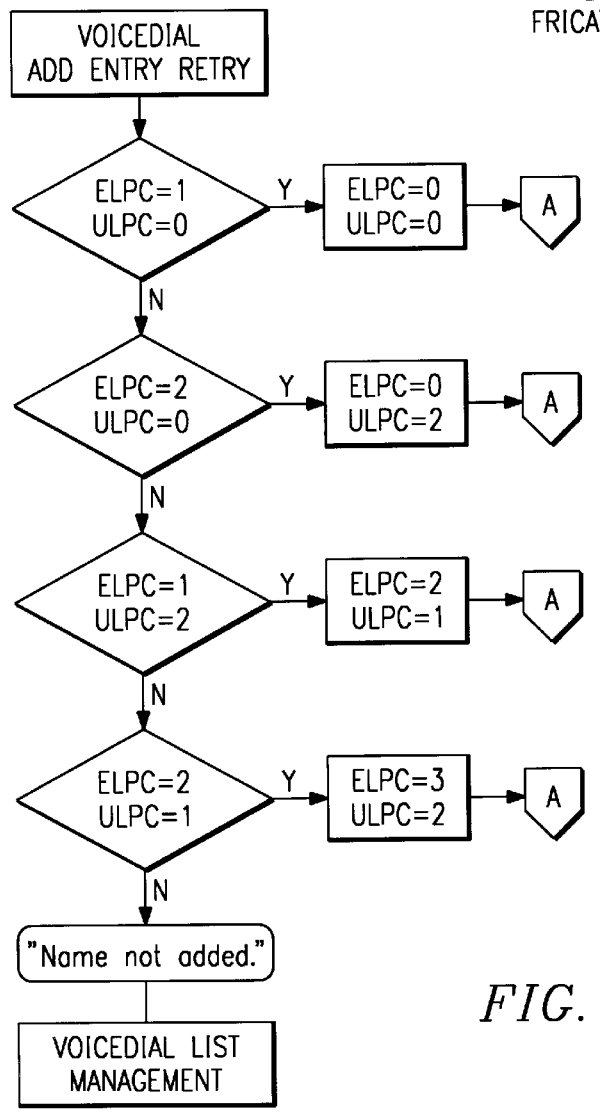
FIG. 9 is a flow chart for voice dial add entry retry in FIG. 8.
Figure 8:
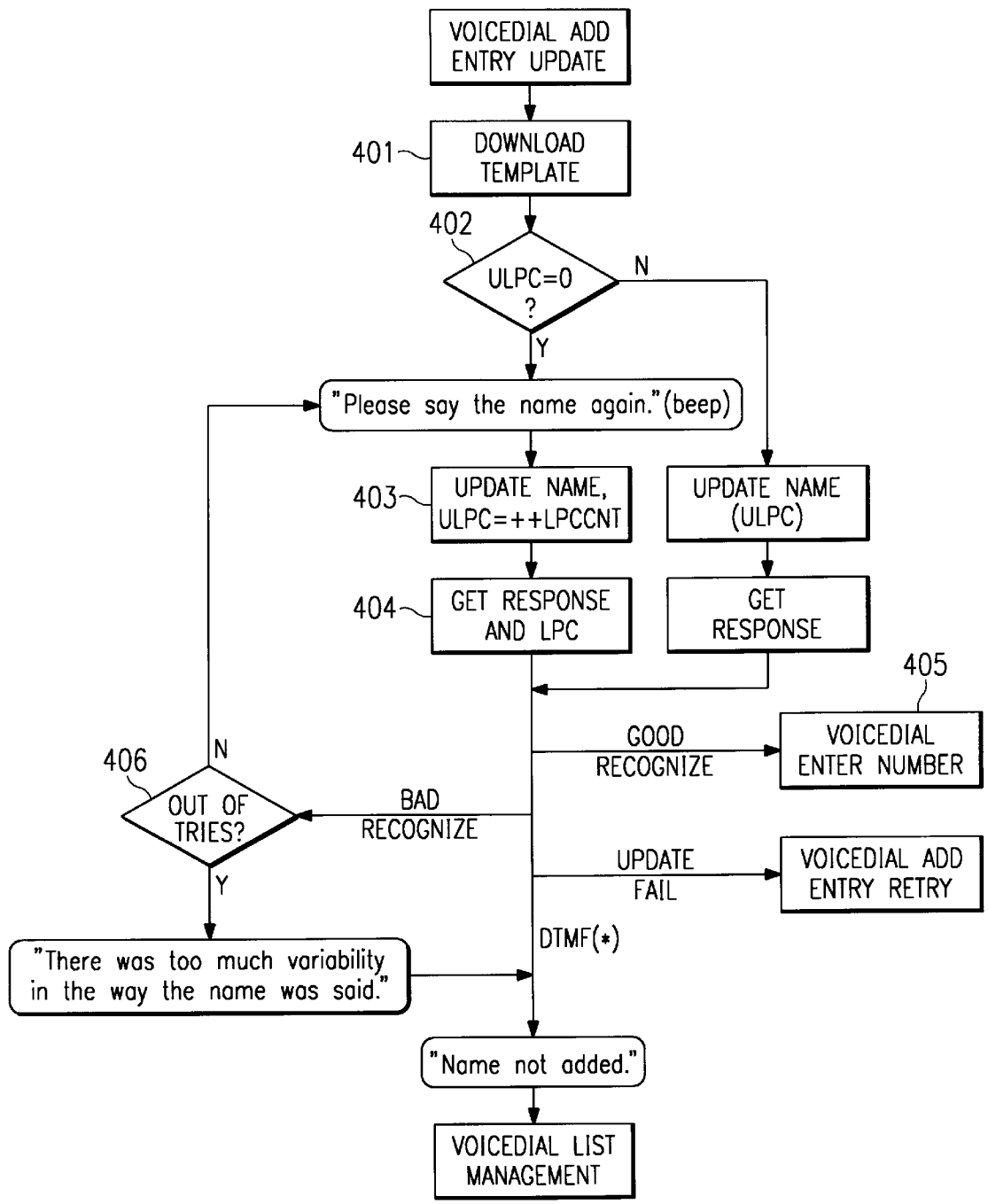
FIG. 8 is a flow chart of voice dial add entry update in FIG. 7.

Referring to FIG. 8 the template is downloaded (step 401) and the system determines if there has been an update. During update, the garbage model is used to explain speech that is not in the enrollment template. For instance, if, during enrollment the user said "uh, Roger Rabbit", then the garbage model explains the "uh" (a gasp), and only the "Roger Rabbit" portion of the update utterance is averaged into the new name template. If the update counter (ULPC) is zero (step 402), this means we have not done an update and the system requests the user via the synthesizer to, "Please say the name again." The update counter is incremented (step 403) and when there is a response an update of the template (step 404) is made using that response. The template is checked to determine if a good update occurred. If a good update did occur the user is asked to enter the phone number for that name (step 405). End is may be keyed in or spoken in using voice recognition with speaker-independent recognition models. If the update fails the system proceeds to Add Entry Retry steps of FIG. 9. If the update fails the enroll and update utterances are swapped and the enrollment and update are attempted in that order. Often a user is not ready for speaking the first time and so an insertion such as "uh" (a gasp) might likely occur before the name is spoken but when we ask to say it again they are prepared to speak. The first template has the gasp of "uh" in it and when we do an update the update may fail because there is no "uh". When we swap utterances the cleaner second utterance is used for enrollment and we update with the first utterance, so the "uh" gasp on the beginning of the utterance is explained by the garbage model and the "uh" is not included in the template. If this swapping of the first and second utterance fails, a third utterance is requested via the out of tries (step 406) is requested and the response and the second utterance are use for the update. If a third utterance is requested for enrollment, then that name is checked first to see if it is too similar to another name on the list. If so it is not used, and processing proceeds to input A in FIG. 5. If the enrollment fails because the utterance was too short, the system will notify the subscriber and re-prompt for another utterance. If the enrollment succeeds, but the utterance (frame length) is too short (is less than the minimum length threshold), then the subscriber will be given a warning that poor recognition results may result because the enrollment name is too short. The subscriber is prompted to say "OKAY" or "CANCEL".

In summary, if an update fails, then the utterances are swapped, to see if the second utterance (or third if required) make a better enrollment utterance than the first. The following order if enrollment and updates is attempted, but only a maximum of three utterances are requested from the user.

| Enroll | Update |
|--------|--------|
| 1 | 2 |
| 2 | 1 |
| 2 | 3 |
| 3 | 2 |
| 3 | 1 |
| 1 | 3 |

OTHER EMBODIMENTS

Although the present invention and its advantages have been described in detail, it should be understood that various changes, substitutions and alterations can be made herein without departing from the spirit and scope of the invention as defined by the appended claims.

What is claimed is:

1. A method of enrolling speech recognition models in a speech recognition database comprising:

providing a penalized garbage model to explain extraneous speech;

receiving a new speech recognition utterance for enrollment from a user;

generating a template of said received utterance for enrollment;

requesting the user to repeat the utterance again to be enrolled;

receiving a second received utterance;

comparing the second utterance to the generated template and the penalized garbage models to determine if a match; and adding said new template to a speed dial list if a match as to in-vocabulary speech.

2. The method of claim 1 wherein the comparison step includes the step of comparing said second utterance to said penalized garbage model for rejecting in said second utterance any utterance that matches within a predetermined degree said penalized garbage model as to out of vocabulary speech compared to the enrolled template.

3. The method of claim 1 including the step of swapping the template and said second received utterance if the comparison fails to match and repeating the comparing step.

4. The method of claim 3 including the step of requesting and receiving a third utterance if after the swapping step fails to get a compare and the third response and the second utterance are compared and if a match entering a template of the second utterance to the database.

5. The method of claim 3 including the step of requesting successive utterances, if after swapping fails to get a compare on previous utterances, and the successive response with a previous utterance are compared and if a match entering a template of successive utterance to the database.

6. A method of enrolling speed dial names in a telephone system comprising:

providing a penalized garbage model to explain extraneous speech;

receiving a new speed dial name utterance for enrollment from a user;

generating a template of said received speed dial name utterance for enrollment;

requesting the user to repeat the new speed dial name utterance again to be enrolled;

receiving a second received new speed dial name utterance;

comparing the second new speed dial name utterance to the generated template and the penalized garbage models to determine if a match; and adding said new speed dial name template to a speed dial list if a match.

7. The method of claim 6 including the step of requesting and adding a telephone number to be associated with said new speed dial name template.

8. The method of claim 7 including the step of swapping the template and said second received speed dial name utterance if the comparison fails to match and repeating the comparing step.

9. The method of claim 8 including the step of requesting and receiving a third new speed dial name utterance if after the swapping step fails to get a compare and the third response and the second utterance are compared and if a match entering the second utterance to the speed dial list.

10. The method of claim 8 including the step of requesting and receiving successive new speed dial name utterances, and if after swapping fails to get a compare on previous utterances, and the successive responses and a previous utterance are compared and if a match entering a template of a successive utterance to the database.

11. The method of claim 10 including the step of requesting and receiving successive new speed dial name utterances, and if after swapping fails to get a compare on previous utterances, and the successive responses and a previous utterance are compared and if a match entering a template of a successive utterance to the database.

12. The method of claim 6 wherein the comparison step includes the step of comparing said second utterance to said penalized garbage model for rejecting in said second utterance any utterance that matches within a predetermined degree said penalized garbage model.

13. The method of claim 12 including the step of swapping the template and said second received speed dial name utterance if the comparison fails to match and repeating the comparing step.

14. The method of claim 13 including the step of requesting and receiving a third new speed dial name utterance if after the swapping step fails to get a compare and the third utterance and the second utterance are compared and if a match entering the second utterance to the speed dial list.

15. A method of enrolling speed dial names in a telephone system comprising:

providing speaker dependent templates of speed dial names and associated telephone numbers;

providing a penalized garbage model for unrecognized speech;

determining if the name to be enrolled matches either a previously provided speaker dependent template or said penalized garbage model and if matches a previously provided speaker dependent template then rejecting the enrollment;

determining if the utterance to be enrolled is less than a minimum length threshold; and determining the user's approval before to adding the template of the utterance to the speed dial list if the utterance is less than said minimum length threshold.

16. A method of enrolling speed dial names in a telephone system comprising:

providing speaker dependent templates of speed dial names and associated telephone numbers;

providing a penalized garbage model for unrecognized speech;

receiving a new speed dial name utterance for enrollment from a user;

generating a template of said received speed dial name utterance enrollment;

determining if the name to be enrolled is too similar to a provided speaker dependent template and if too similar rejecting the enrollment or if matching the garbage model, then allowing the enrollment;

determining if the utterance to be enrolled is less than a minimum length threshold and if the utterance is less than said minimum length threshold determining the user's approval before to adding the template of the utterance to the speed dial list;

requesting the user to repeat the new speed dial name utterance again to be enrolled;

receiving a second received new speed dial name utterance;

comparing the second new speed dial name utterance to the generated template and the penalized garbage models to determine if a match; and adding said new speed dial name template to a speed dial list if a match.

17. The method of claim 16 including the step of requesting and adding a telephone number to be associated with said new speed dial name template.

18. The method of claim 17 including the step of swapping the template and said second received speed dial name utterance if the comparison fails to match and repeating the comparing step.

19. The method of claim 18 including the step of requesting and receiving a third new speed dial name utterance if after the swapping step fails to get a compare and the third response and the second utterance are compared and if a match entering the second utterance to the speed dial list.

20. The method of claim 16 wherein the comparison step includes the step of comparing said second utterance to said penalized garbage model for rejecting in said second utterance any utterance that matches within a predetermined degree said penalized garbage model.

21. A telephone apparatus for enrolling speed dial names comprising:

a memory storing speaker dependent templates of speed dial names and associated telephone numbers;

a memory storing a penalized garbage model for unrecognized speech;

a comparator for comparing the name to be enrolled to said stored speaker dependent templates or said penalized garbage model for rejecting the enrollment if too similar; and means for determining if the utterance to be enrolled is less than a minimum length threshold or if the utterance is less than said minimum length threshold determining the user's approval before adding the template of the utterance to the speed dial list.

22. A telephone apparatus for enrolling speed dial names comprising:

a storage device storing a penalized garbage model for unrecognized speech;

a receiver for receiving a new speed dial name utterance for enrollment from a user;

a generator coupled to said receiver for generating a template of said received speed dial name utterance for enrollment;

means for requesting the user to repeat the new speed dial name utterance again to be enrolled;

said receiver in response to receiving said second received new speed dial name utterance comparing the second new speed dial name utterance to the generated template and the penalized garbage model to determine if a match; and means for adding said new speed dial name template to a speed dial list if a match.

23. The telephone apparatus of claim 22 including means for requesting and adding a telephone number to be associated with said new speed dial name template.

24. The telephone apparatus of claim 22 wherein said receiver includes means for swapping the template and said second received speed dial name utterance if the comparison fails to match and for again comparing.

25. The telephone apparatus of claim 24 including means for requesting and receiving a third new speed dial name utterance if after the swapping step fails to get a compare and the third response and the second utterance are compared and if a match entering the second utterance to the speed dial list.

26. The telephone apparatus of claim 22 wherein said receiver includes means for comparing said second utterance to said penalized garbage model for rejecting in said second utterance any utterance that matches within a predetermined degree said penalized garbage model.

27. The telephone apparatus of claim 26 wherein said receiver includes means for swapping the template and said second received speed dial name utterance if the comparison fails to match and repeating the comprising step.

28. The telephone apparatus of claim 27 wherein said receiver includes means for requesting and receiving a third new speed dial name utterance if after the swapping step fails to get a compare and the third utterance and the second utterance are compared and if a match entering the second utterance to the speed dial list.

29. An apparatus for enrolling speech templates in a speech recognition database comprising:

a storage device storing a penalized garbage model for unrecognized speech;

a receiver for receiving a new speech address utterance for enrollment in said database from a user;

a generator coupled to said receiver for generating a template of said received speech address utterance for enrollment;

means for requesting the user to repeat the new speech address utterance again to be enrolled;

said receiver in response to receiving said a second received new speech address utterance comparing the second utterance to the generated template and the penalized garbage models to determine if a match; and means for adding said new template to a said database if a match said new speed dial name template.

30. The telephone apparatus of claim 29 wherein said receiver includes means for swapping the template and said second received utterance if the comparison fails to match and for again comparing.

31. The telephone apparatus of claim 30 including means for requesting and receiving a third utterance if after the swapping step fails to get a compare and the third response and the second utterance are compared and if a match entering the second utterance to the database.

32. The telephone apparatus of claim 29 wherein said receiver includes means for comparing said second utterance to said penalized garbage model for rejecting in said second utterance any utterance that matches within a predetermined degree said penalized garbage model.

\* \* \* \* \*